United States Patent [19]

Zimmermann

[11] 4,187,160

[45] Feb. 5, 1980

[54] METHOD AND APPARATUS FOR OPERATING AN ELECTROPHORETIC INDICATING ELEMENT

[75] Inventor: Andreas Zimmermann, Emmenbrücke, Switzerland

[73] Assignee: BBC Brown, Boveri & Company, Ltd., Baden, Switzerland

[21] Appl. No.: 925,763

[22] Filed: Jul. 18, 1978

[30] Foreign Application Priority Data

Nov. 11, 1977 [CH] Switzerland ................ 13774/77

[51] Int. Cl.² ............... C25D 13/18; G02F 1/40
[52] U.S. Cl. .................. 204/180 R; 204/299 R; 204/299 EC; 340/787; 355/5; 350/355; 430/35
[58] Field of Search ........ 204/180 R, 181 R, 181 PE, 204/299 R, 299 EC; 96/1 A; 340/324 R; 350/160 R, 267; 355/5, 160 R

[56] References Cited

U.S. PATENT DOCUMENTS

| | | | |
|---|---|---|---|
| 3,674,475 | 7/1972 | Silverberg | 204/299 PE X |
| 3,756,693 | 9/1973 | Ota | 204/299 PE X |
| 4,045,327 | 8/1977 | Noma et al. | 204/299 R |
| 4,062,009 | 12/1977 | Raverdy et al. | 204/299 R X |
| 4,071,430 | 1/1978 | Liebert | 204/299 R |

Primary Examiner—Arthur C. Prescott
Attorney, Agent, or Firm—Oblon, Fisher, Spivak, McClelland & Maier

[57] ABSTRACT

A method and apparatus for operating an electrophoretic indicating element driven by a drive signal, wherein the drive signal is modulated by an alternating voltage signal superimposed on the drive signal and having a frequency sufficiently high to prevent observation thereof. The modulating signal can have either a sinusoidal, triangular, or rectangular wave shape, or can be a succession of individual wave trains wherein the duration of each wave train is selected in accordance with the composition of the electrophoretic switching element.

7 Claims, 8 Drawing Figures

METHOD AND APPARATUS FOR OPERATING AN ELECTROPHORETIC INDICATING ELEMENT

BACKGROUND OF THE INVENTION

1. Field of the Invention

This invention relates to a method of operating an electrophoretic indicating element and to an apparatus which includes such an element and is arranged to operate the element according to this method.

2. Description of the Prior Art

The operation of electrophoretic indicating elements has been described in detail by I. Ota, J. Ohnishi and M. Yoshiyama (Proc. IEEE, Vol. 61 (1973) pages 832–836). When such indicating elements are used, agglomerations of the pigment particles are observed after some time, for example in the form of rasters. The individual raster dots consist of a plurality of particles of which only some, namely those at the periphery, and after prolonged operation not even these, switch over, that is to say migrate to the other electrode on a reversal of the external electrical field. As a result of the clearly visible reticulation (the distance between the individual raster dots is between 0.5 and 2 mm for example) or other agglomerations, the general impression of the indication is very adversely affected and the contrast between surface elements with different switching states is considerable reduced.

It has already been proposed by manufacturers of such electrophoretic indicating elements that, on the appearance of visible agglomerations of the pigment particles, the indicating elements should be operated for a while with a rectangular alternating voltage of 1 Hz and 150 $V_{ss}$ for example. Such a method requires an interruption in the indicating operation, however. In addition, the disturbing raster formation is only eliminated for a relatively short period of time.

SUMMARY OF THE INVENTION

Accordingly, it is the object of this invention to provide a novel method of operating an electrophoretic indicating element wherein disturbing raster formations or agglomerations of the pigment particles are largely prevented, without the indicating operation having to be interrupted, so that the contrast and the general impression of the indication are considerably better than in known arrangements.

In accordance with the invention, there is provided a method of operating an electrophoretic indicating element, in which method an alternating-voltage signal is directly superimposed on a signal which is used to drive the indicating element. Preferably the frequency of the superimposed alternating-voltage signal is selected so high that switching operations caused in the indicating element by this signal can no longer be perceived by the observer. This is the case with frequencies higher than 20 Hz.

It has been found that, with this method, not only is the raster formation absent so that the contrast of the indicating elements is very high, but also the speed of switching over from one state into the other (for example from yellow to blue) takes place considerably more quickly than in indicating elements operated by known methods. In addition, an increase in the life of the electrophoretic indicating element thus operated has been found.

Neither the shape nor the amplitude of the superimposed alternating-voltage signal are critical. Not only sinusoidal but also rectangular and triangular signals could be used successfully. The amplitude of the superimposed alternating-voltage signal could be less than or greater than the amplitude of the indicating drive signal, or it could be of the same amplitude. Preferably the amplitude of the superimposed alternating voltage signal is of the same order of magnitude as the amplitude of the drive signal.

BRIEF DESCRIPTION OF THE DRAWINGS

A more complete appreciation of the invention and many of the attendant advantages thereof will be readily obtained as the same becomes better understood from the following detailed description when considered in connection with the accompanying drawings, wherein.

DETAILED DESCRIPTION OF THE PREFERRED EMBODIMENTS

Figure 1:
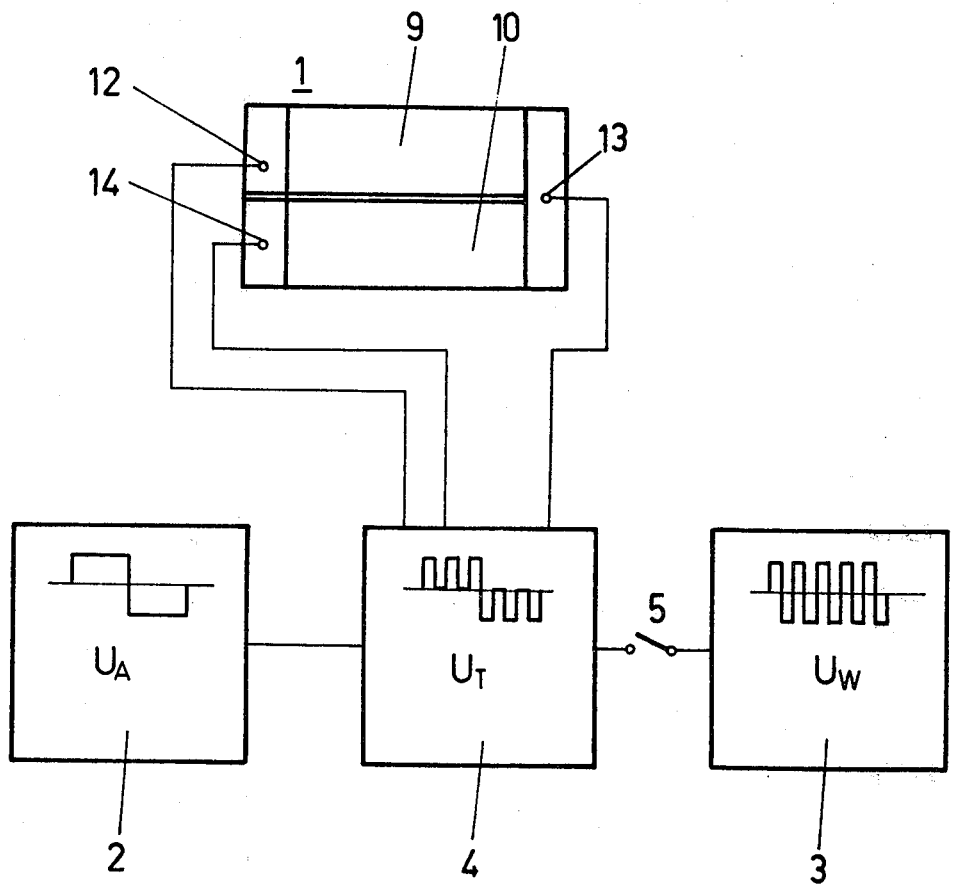
FIG. 1 is a block diagram of an apparatus including an indicating element and control means for this element.

Referring now to the drawings, wherein like reference numerals designate identical or corresponding parts throughout the several views, and more particularly to FIG. 1 thereof, the electrophoretic indicating element designated by 1 is operated through a three-part control means 2, 3, 4. The indicating signal $U_A$ is produced by a generator 2 and the alternating-voltage signal $U_W$ to be superimposed is produced by a generator 3. The two signals are then combined in a modulator 4 to form the resulting signal $U_T$ which is supplied to the indicating element 1 through its appropriate connections 12, 13, 14. A switch 5 is disposed between modulator 4 and generator 3.

The indicating element designated by 1 in FIG. 1 can, for example, be constructed in the form of a cell with yellow-blue indication with two contrasting surface elements of equal size.

Figure 2A:
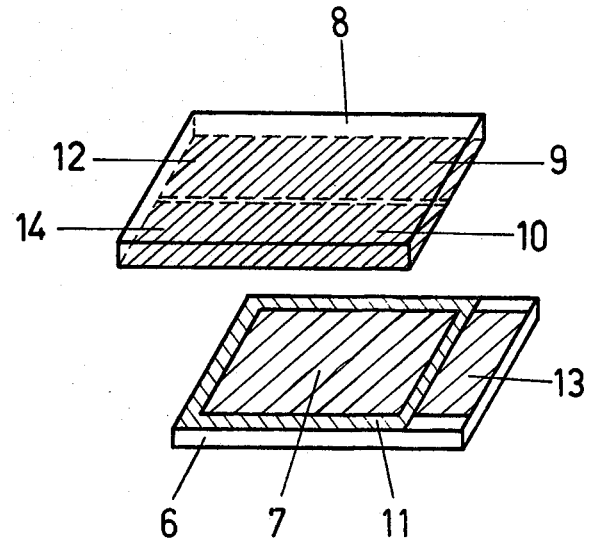
FIGS. 2a and 2b are respectively exploded perspective and section views of an indicating element of the apparatus of FIG. 1.
Figure 2B:
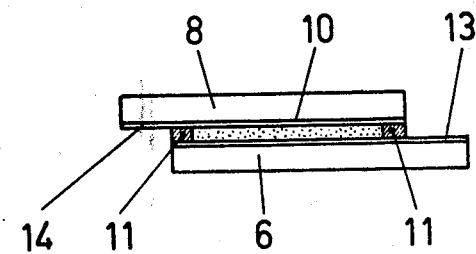

FIGS. 2a and 2b represent such a cell in detail. It consists of a lower glass plate 6 with a transparent electrode 7 formed on a surface thereof and an upper glass plate 8 with a two-part transparent electrode 9 and 10, which altogether occupies about the same area as the electrode of the lower glass plate. By means of a continuous strip of glass solder 11 at the edges of the glass plates 6 and 8, these are joined together so that the electrodes 7 and 9, 10 are opposite one another in the interior of the cell and so that the one plate is offset in relation to the other so that the electrical connections 12, 13 and 14 of the electrodes 9, 7 and 10, respectively, are outside the web of glass solder 11. In the cell itself there is a suspension 15 which is composed of the following constituents:

1.5 parts by weight of Hansa yellow of the Farbwerke Hoechst AG, Frankfurt a.M.

19 parts by weight of solvent mixture consisting of carbon tetrachloride and 1, 1,2-trichlorotrifluorethane of the Fluka AG, Busch SG.

0.03 parts by weight of fat blue B of the Farbwerke Hoechst AG, Frankfurt a.M.

The pigment particles (Hansa yellow) are negatively charged in this suspension 15.

Figure 3A:
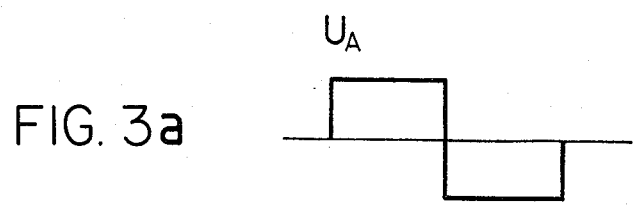
FIGS. 3a to 3e are waveforms illustrating an indicating drive signal $U_A$, and different superimposed alternating-voltage signals $U_W$, and signals $U_T$ resulting from the sum of these two.

Tests have been conducted in which first a rectangular indicating drive signal $U_A$, illustrated in FIG. 3a, was applied between the connections 12 and 14. The amplitude of the signal $U_A$ amounted to 80 V, the frequency 0.5 Hz. The connection 13 served as a neutral conductor. By way of example, when the positive voltage appears at the connection 12, then the negative particles of the suspension 15 travel to the electrodes 9 and the surface element covered by this electrode appears yellow when seen from above. Since, at this time, the electrode 7 likewise has a positive potential in relation to the electrode 10, the negative particles travel to the electrode 7 in the region below the electrode 10. In the region of the electrode 10, the corresponding surface element therefore appears blue when seen from above because in this case only the solution intensively colored by the coloring matter can be seen, out of which the negative pigment particles have travelled to the electrode away from the observer.

Figure 3B:
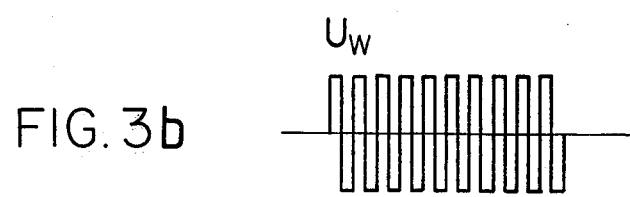
Figure 3C:
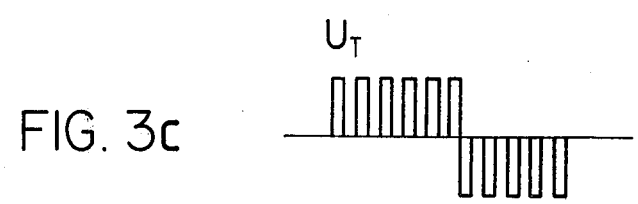

After only five minutes of continuous operation of this cell, a raster-like deposit of non "switching" particles on the electrodes 7, 9 and 10 was visible from the outside. Then the likewise rectangular alternating-voltage signal $U_W$, shown in FIG. 3b, was superimposed on the indicating drive signal $U_A$, by closing the switch 5 (FIG. 1), so that the driving signal $U_T$ illustrated diagrammatically in FIG. 3c resulted. The amplitude of the signal $U_W$ amounted to 80 V, the frequency 50 Hz.

Within a few minutes a distinct improvement of the cell occurred in each of the two switching states which are determined by the drive signal $U_A$. Finally, the surface element of the indication, the upper electrode of which had a positive potential after application of the signal $U_A$ was a uniform yellow, and the other, the upper electrode of which was at negative potential, was a uniform dark blue. The contrast and the switching speed, that is to say the speed at which the pigment particles travelling electrophoretically, follow changes in the signal $U_A$, were distinctly improved in comparison with operation without the superimposed alternating-voltage $U_W$. The cell could now be operated without interruption for several days with the signal values given, without any visible alteration. A raster did not even appear if the cell was operated from the beginning with a signal $U_T$, as shown diagrammatically in FIG. 3c.

It has been found that the cell can be operated successfully at frequencies less than 50 Hz of the signal $U_W$, and indeed down to frequencies of about 5 Hz. Nevertheless, after about 10 Hz a flickering could be detected at the moment of switching over from on indicating state into the other, even with amplitudes of less than $U_W U_A$, which is attributable to the presence of the signal $U_W$.

Figure 3D:
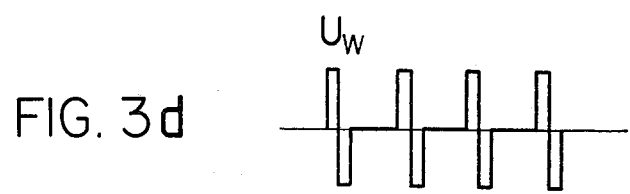
Figure 3E:
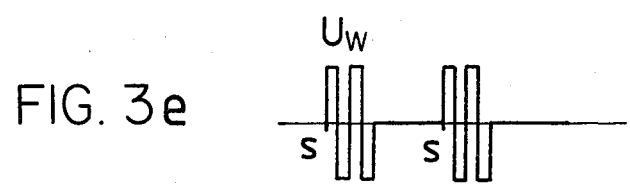

The alternating voltage $U_W$ may also consist of individual pulses, as represented in FIG. 3d, or have periods of different duration in the positive and negative directions. Furthermore, a form of the alternating voltage is possible, as illustrated in FIG. 3e. Preferably, in this case, as a result of an appropriate mode of operation of the modulator 4, the starting point s coincides with the moment of alteration of the switching state of the indicating drive signal $U_A$ (see FIG. 3a). This form of embodiment is appropriate, above all, when the indicating signal $U_A$ goes back to zero for a period after a change in the indicating state, because electrophoretic elements can maintain their indicating state for a long time without any voltage being applied.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating an electrophoretic indicating element having a suspension containing a pigment which exhibits a switching time, in which said element is driven by a drive signal, comprising:
    superimposing an alternating voltage signal directly on said drive signal.

2. A method as claimed in claim 1, in which the frequency of the superimposed alternating-voltage signal is sufficiently high such that switching operations caused in the indicating element by this signal can not be perceived by an observer.

3. A method as claimed in claim 2, in which the frequency of the superimposed alternating-voltage signal is greater than or equal to 20 Hz.

4. A method as claimed in claim 1, wherein the superimposed alternating-voltage signal is sinusoidal.

5. A method as claimed in claim 1, wherein the superimposed alternating-voltage signal is triangular.

6. A method as claimed in claim 1, wherein the superimposed alternating-voltage signal is rectangular.

7. A method as claimed in claim 1, wherein the superimposed alternating-voltage signal comprises a succession of individual wave trains, the duration of each wave train being at least equal to the switching time of the pigment, and the beginning of each wave train coinciding with an alteration in switching state.

* * * * *